United States Patent [19]
Bogar et al.

[11] 3,986,752
[45] Oct. 19, 1976

[54] RESILIENT CENTER BEARING ASSEMBLY

[75] Inventors: William Henry Bogar, Newark; Howard Dale Irwin, Wilmington, both of Del.

[73] Assignee: E. I. Du Pont de Nemours and Company, Wilmington, Del.

[22] Filed: May 9, 1975

[21] Appl. No.: 576,227

Related U.S. Application Data
[63] Continuation-in-part of Ser. No. 460,189, April 11, 1974, abandoned.

[52] U.S. Cl. ............................ 308/137; 105/199 C
[51] Int. Cl.² ...................... B61F 5/16; F16C 17/04; F16C 27/08; F16F 1/44
[58] Field of Search ........ 105/197 A, 199 C, 199 R; 308/137

[56] References Cited
UNITED STATES PATENTS

| | | | |
|---|---|---|---|
| 1,485,799 | 3/1924 | Miner .................................. | 308/137 |
| 2,258,640 | 10/1941 | Beckette ...................... | 105/199 C X |
| 2,509,955 | 5/1950 | Barnes ........................... | 105/199 C |
| 2,514,034 | 7/1950 | Dean ................................ | 105/199 C |
| 2,704,518 | 3/1955 | De Buzareinques ............ | 105/199 R |
| 3,218,989 | 11/1965 | Kreiner et al. ....................... | 105/200 |
| 3,226,611 | 6/1967 | CHristian .............................. | 308/137 |
| 3,326,611 | 6/1966 | Christian ........................ | 105/199 C |
| 3,405,654 | 10/1968 | Dilg .................................... | 105/199 C |
| 3,762,694 | 10/1973 | MacDonnell ............... | 105/197 A X |
| 3,789,771 | 2/1974 | Jackson .......................... | 105/199 C |

OTHER PUBLICATIONS
American Society for Testing Materials, 1967, Book of ASTM Standards, Apr. 1967, Title Page and 1009-1012 inc.

Primary Examiner—Robert J. Spar
Assistant Examiner—Howard Beltran

[57] ABSTRACT
A railway car center plate assembly comprising a truck bolster having a bowl-shaped truck center plate and a body bolster having secured to its underside a body center plate. The body center plate has a flat surface from which extend downwardly two substantially perpendicular, concentric, cylindrical flanges encircling a bore, the diameter of the outermost flange being such that its outer vertical surface is encompassed by the inner vertical surface of the flange on the truck center plate. Positioned between the body center plate and the truck center plate is an annular, synthetic elastomeric bearing pad which is located within and substantially fills the annular space between the flanges of the body center plate and under load contacts the vertical surfaces of the flanges of the body center plate.

4 Claims, 4 Drawing Figures

3,986,752

RESILIENT CENTER BEARING ASSEMBLY

CROSS-REFERENCE TO RELATED APPLICATION

This application is a continuation-in-part of application Ser. No. 460,189, filed Apr. 11, 1974, now abandoned.

BACKGROUND OF THE INVENTION

This invention relates to railway rolling stock and, more particularly, to a railway car center plate assembly.

The swivel connection of railway vehicles comprises a center plate assembly that is disposed between the car body or frame and the truck, allowing the truck to turn under the car about a centerpin. The center plate assembly conventionally used in railway cars comprises a body center plate attached to the underside of the body bolster and a truck center plate having the shape of a bowl and being secured to the top side of the truck bolster or cast integrally therewith. The body center plate secured to the body bolster and truck center plate secured to the truck bolster are provided with coaxial openings which receive a center pin therein to guide the engagement of the parts.

Under conditions in which railway cars are operated, breakage of the center plate assembly occurs much too frequently, especially in the larger cars currently coming into broad usage. During normal operations of railroad freight cars, the body center plate is the structural member which, together with the side bearings, transfers the railroad car load onto the truck. When in motion, the railroad car rocks from side to side. When the car rocks to one side a very small load-bearing surface, i.e., the peripheral edge of the body center plate, carries the weight of the car. The concentration of the car load on the body center plate plus the fact that it is intermittently applied and released has resulted in fatigue cracking of the center plate. Failure of the body center plate or the means of its attachment causes loss of car operating time while the center plate is being replaced or repaired. Accordingly, there has been a need for a railway car center plate assembly in which high-bearing stresses between the body center plate and truck center plate induced by the car rocking back and forth on the edges of the body center plate as it bears on one side bearing, then the other, are eliminated, thus assuring longer use. Further, there is a need for a center plate assembly that provides sufficient resistance to rotation of the truck to reduce the tendency of the truck to oscillate about the center plate, a condition known as "hunting".

BRIEF DESCRIPTION OF THE INVENTION

This invention relates to a railway car center plate assembly comprising a truck bolster and a body bolster, the truck bolster being rotatable with respect to the body bolster and having secured to its top side a bowl-shaped truck center plate provided with a bore, said center plate having an upwardly projecting flange around its periphery and a portion of the center plate between the flange and the bore defining a flat-bearing surface; said body bolster having secured to its underside a body center plate having a flat surface from which extend downwardly two substantially perpendicular, concentric, cylindrical flanges encircling a bore, the diameter of the outermost flange being such that its outer vertical surface is encompassed by the inner vertical surface of the flange on the truck center plate; said bores are centrally located within the center plate and concentric with the flanges and are adapted to receive a centerpin, and positioned between the body center plate and truck center plate an annular, synthetic elastomeric bearing pad which is located within and substantially fills the annular space between the flanges of the body center plate and under load said pad contacts the vertical surfaces of the flanges of the body center plate, said elastomeric pad alone transmits the weight of the car from the body center plate to the truck center plate.

Preferably the elastomeric pad is provided with a layer of metal on either, or both, bearing surfaces. A thin plate of metal, preferably steel, is useful because it provides a lower friction bearing surface when lubricated in a conventional manner to permit the truck bolster to rotate by sliding at the bearing surface. The center plate assembly of the instant invention normally permits the trucks to rotate through the small angles required to negotiate mainline curves by shear stressing of the elastomeric bearing pad without accompanying slippage at the bearing surfaces. In negotiating the sharper curves in railroad yards, it is often necessary that some of the truck rotation occur by slippage at the bearing surface. The lubricated metal layer on the pad facilitates such slippage. The elastomeric pad is usually fabricated from a synthetic elastomer having a hardness, according to ASTM Method D-2240, of not less than 50 durometer D. Preferably, the elastomeric pad is a solid polyurethane elastomer.

DESCRIPTION OF PREFERRED EMBODIMENTS

Figure 1:
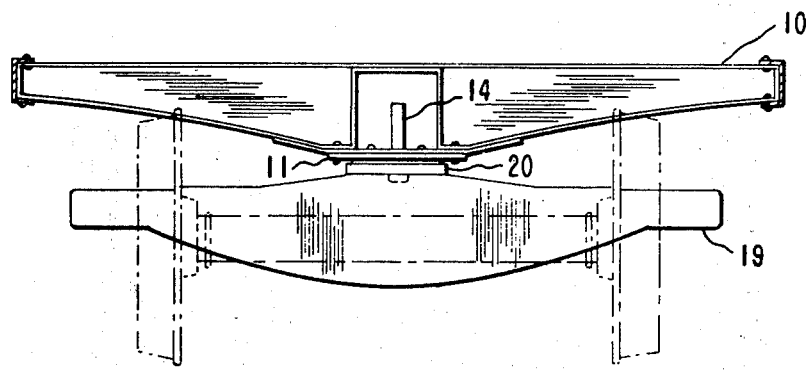
FIG. 1 is a front elevation view of a swivel connection of a railway car showing a body bolster and truck bolster with the center plate assembly.
Figure 2:
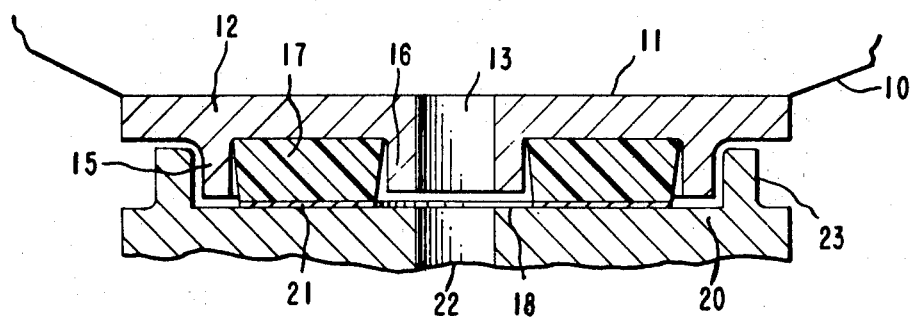
FIG. 2 is a vertical sectional view showing, in enlargement, the assembly of the body and truck center plates in detail.
Figure 3:
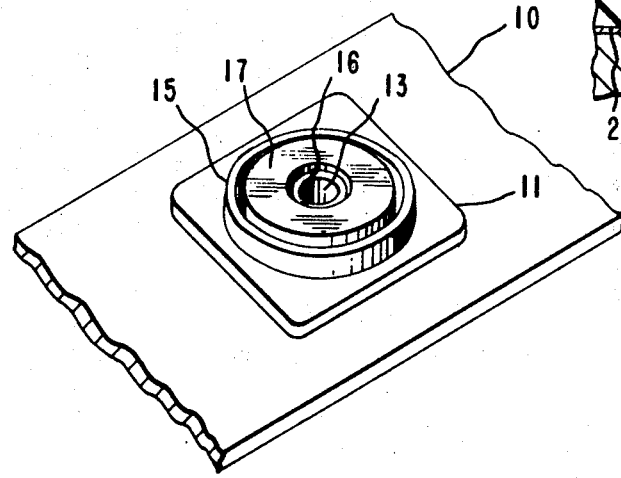
FIG. 3 is an inverted perspective view of a portion of a car body bolster and body center plate.
Figure 4:
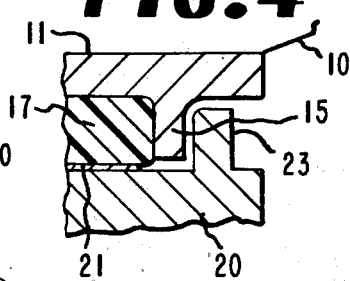
FIG. 4 is a fragmentary view of the assembly showing the displacement of the elastomeric pad under load contacting the vertical surface of a flange of the body center plate.

The center plate assembly of the railway car swivel connection comprises a body bolster 10 having a body center plate 11. Center plate 11 comprises a flat metal base plate 12 having a central bore 13 for receiving center pin 14. Two concentric flanges, outer flange 15 and inner flange 16, project downwardly from the under side of base plate 12 encircling bore 13. An annular, synthetic elastomeric bearing pad 17 is located between the metal outer flange 15 and inner flange 16. The elastomeric pad almost fills all the space between the concentric flanges and extends below the bottom ends of the flanges. When the center plate assembly is under load elastomeric bearing pad 17 contacts the vertical surfaces of the flanges 15 and 16 of body center plate 11. A thin metal-bearing plate 21 covers the bearing surface of elastomeric pad 17.

The trucks of the railway car each have a truck bolster 19 lying beneath body bolster 10 and each truck bolster is provided on its top side with bowl-shaped truck center plate 20 having a flat bottom surface 18 serving as a bearing surface. The truck center plate is formed with a central vertical bore 22 of the same diameter as central bore 13 of center plate 11 and adapted to receive center pin 14. The outer peripheral wall of center plate 20 is in the form of an upstanding flange 23. In operation, the vertical surface of outer flange 15 will contact the inner vertical surface of flange 23 of truck center plate 20, thus transmitting to the truck horizontal loads resulting from braking and acceleration.

Truck center plate 20 cast integrally with the truck bolster 19 is the conventional design used in most railway vehicles. Consequently, it is possible to convert the conventional bearing arrangement to the improved assembly as described in the present invention merely by replacing the conventional body center plate with the novel body center plate described in the present invention that is provided with an elastomeric bearing pad, positioned between inner and outer flanges of the body center plate, that carries all the weight of the car and distributes the load more evenly over the bearing surface.

Preferably the bearing surface of elastomeric bearing pad 17 will be as large as possible for maximum delocation of stress. Consequently, the two concentric metal flanges 15 and 16 generally will be located as far from one another as spacial requirements permit. For example, outer flange 15 can be located close to the outer periphery of the bearing surface of body center plate 11 and the inner flange 16 can be located close to central bore 13. Generally, annular, disc-shaped elastomeric bearing pad 17 has a diameter that is from two to four times the diameter of its bore.

The elastomeric pad 17 is made of any suitable synthetic elastomer which is tough, flexible and stretchable and has good load bearing and wear resistance characteristics. Preferably, the elastomer is a hard polyurethane comprising the reaction of product of an organic polyisocyanate, preferably an aromatic polyisocyanate, a polyester or a polyalkyleneether polyol having a molecular weight between about 500 and 3000, and a glycol or an organic polyamine having a molecular weight below about 350. In this class of polyurethanes, "Adiprene" L-200 urethane rubber (E. I. du Pont de Nemours and Company), which has a hardness of about 58 durometer D, as measured by ASTM Method D-2240, is especially preferred. The elastomer used preferably has a hardness of not less than 50 durometer D (ASTM Method D-2240). Other synthetic elastomeric materials that can be used that have good load-bearing qualities include polychloroprene, ethylene/propylene copolymers having one or more non-conjugated dienes, chlorosulfonated polyethylene, styrene-butadiene rubber, and copolymers of butadiene and acrylonitrile.

The center plate assembly of the present invention permits delocalization of stress at the bearing surface and substantially reduces the incidence of structural damage to the body center plate and other structural members to which it is attached. When the full weight of the railway car bears on the center plate assembly, it is imperative for the benefits of the invention to be realized that the thickness and modulus of the bearing pad 17 is such that the full weight of the car is borne by elastomeric bearing pad 17 and that its compression under this weight is insufficient to cause flange 15 of body center plate 11 to contact the bearing surface of truck center plate 20. Otherwise, metal-to-metal contact will cause undesirable concentration of stress encountered in conventional bearing arrangements. A built-in safety advantage of the present invention, however, is the fact that contact of the flanges of body center plate 11 with the bearing surface of truck center plate 20 provides a temporary backup bearing system in the event that the elastomeric pad 17 fails in use. This backup system would permit the car to be operated until a new bearing pad could be put in place.

Optionally, elastomeric bearing pad 17 can have bonded to either, or both, its upper and lower surfaces a thin annular metal plate. In a situation where either one or both of the surfaces of the elastomeric pad are not bonded to a metal plate, one of the free surfaces can be bonded to one of the center plate-bearing surfaces. In this latter situation, the bearing surface to which the pad is bonded is preferably the body center plate. Bonding is accomplished by employing a suitable adhesive. An advantage of bonding the bearing pad and the body center plate in this fashion is facilitation of the assembly of the truck center plate to the body center plate, and to insure that if relative movement between bearing pad and mating flat surface occurs the sliding is confined to lower surface of said pad and flat surface of truck center plate.

We claim:

1. A railway car center plate assembly comprising a truck bolster and a body bolster, the truck bolster being rotatable with respect to the body bolster and having secured to its top side a bowl-shaped truck center plate provided with a bore, said center plate having an upwardly projecting flange around its periphery and a portion of the center plate between the flange and the bore defining a flat-bearing surface; said body bolster having secured to its underside a body center plate having a flat surface from which extend downwardly two substantially perpendicular, concentric, cylindrical flanges encircling a bore, the diameter of the outermost flange being such that its outer vertical surface is encompassed by the inner vertical surface of the flange on the truck center plate; said bores are centrally located within the center plate and concentric with the flanges and are adapted to receive a center pin, and positioned between the body center plate and truck center plate an annular, synthetic elastomeric bearing pad which is located within and substantially fills the annular space between the flanges of the body center plate, and under load said pad contacts the vertical surfaces of the flanges of the body center plate, said elastomeric pad alone transmits the weight of the car from the body center plate to the truck center plate.

2. A center plate assembly of claim 1 wherein the elastomeric pad is a solid polyurethane.

3. A center plate assembly of claim 2 wherein the elastomeric pad is provided with a layer of metal on at least one of its bearing surfaces.

4. A center plate assembly of claim 2 wherein the elastomeric pad is adhesively bonded to the base plate of the body center plate.

* * * * *